United States Patent [19]
Sprowls

[11] 3,774,319
[45] Nov. 27, 1973

[54] METHOD AND APPARATUS FOR TEACHING

[76] Inventor: Christopher R. Sprowls, 51 Afton Avenue, Pittsburgh, Pa. 15205

[22] Filed: Aug. 10, 1971

[21] Appl. No.: 170,486

[52] U.S. Cl. .................................... 35/37, 35/71
[51] Int. Cl. ........................................ G09b 11/02
[58] Field of Search .................... 35/35 J, 37, 38, 35/71, 69, 70; 273/137 B, 137 C

[56] References Cited
UNITED STATES PATENTS

| | | | |
|---|---|---|---|
| 550,584 | 12/1895 | Bristow | 273/137 C |
| 1,103,369 | 7/1914 | Montessori | 35/71 |
| 3,382,592 | 5/1968 | Lucero | 35/37 |
| 3,528,183 | 9/1970 | Lucero | 35/37 |

FOREIGN PATENTS OR APPLICATIONS

| | | | |
|---|---|---|---|
| 670,476 | 9/1963 | Canada | 35/37 |
| 14,412 | 0/1889 | Great Britain | 35/37 |
| 193,470 | 2/1923 | Great Britain | 35/71 |

Primary Examiner—Harland S. Skogquist
Attorney—Green, McCallister & Miller

[57] ABSTRACT

Blocklike elements are used in combination in a letter or number series for teaching handicapped and particularly blind and retarded persons and children by kinesthetic patterns. Each block has a particular letter, number or other symbol on its top face that is in the form of a recess and that has visual and physical indicia to represent and in use indicate the order of forming or making the symbol, the stroke portions involved in and the progression and direction of movement to be employed in the forming thereof. Each block also has indicia for indicating the bottom of the particular symbol and thus how the selected block should be aligned for proper reading of its indicia.

2 Claims, 3 Drawing Figures

Patented Nov. 27, 1973 3,774,319
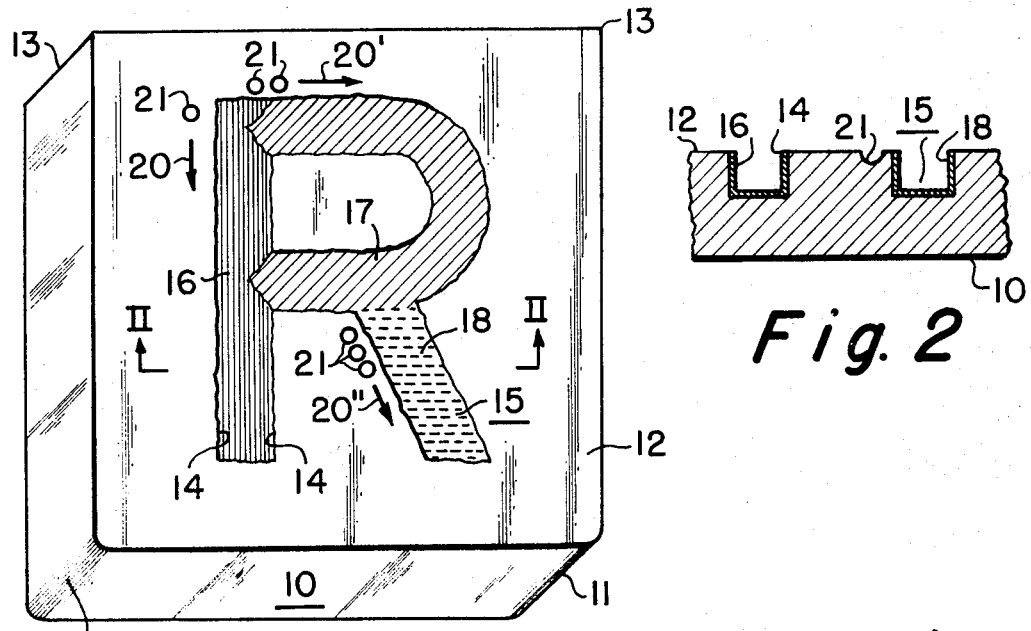
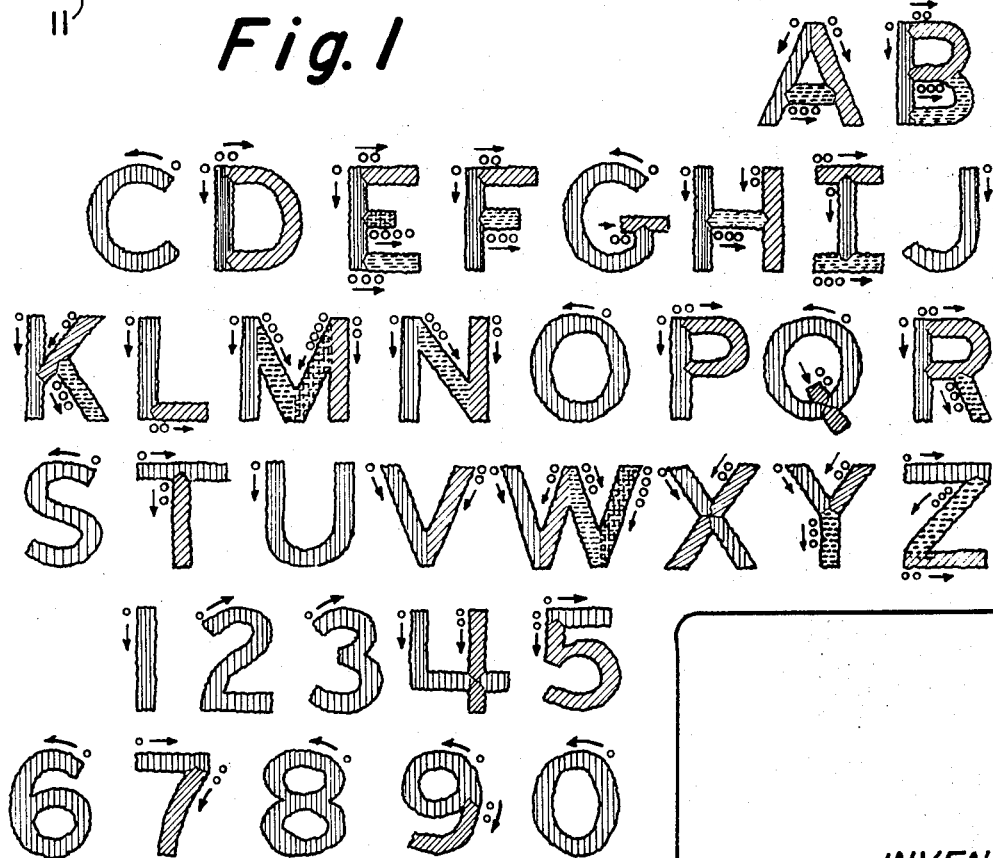
o = red   o o o = silver
o o = brown   o o o o = yellow
Fig. 3
INVENTOR.
Christopher R. Sprowls
BY
Green, McCallister & Miller
HIS ATTORNEYS

METHOD AND APPARATUS FOR TEACHING

BACKGROUND OF THE INVENTION

1. Field of the Invention

This invention pertains to kinesthetic pattern structure or elements and particularly, to configurated teaching blocks. A phase of the invention deals with means or a method of teaching handicapped persons and particularly, blind and retarded children to understand and make letters, numbers and other symbols.

2. SUMMARY OF THE INVENTION

The present invention has been developed to meet an urgent need in the training of so-called handicapped persons, and particularly children. The purpose is to facilitate and speed-up the teaching of symbols, such as alphabetic letters, numbers, etc., that are in common use and are required basically in effective reading and writing. It has been determined that best results are obtained by using means that although suitable for blind and other handicapped persons, is particularly suitable for training retarded persons. In this connection, it has been discovered that learning can be facilitated by, in the case of retarded persons, employing more than one sense, with particular emphasis on the physical sense of touch or feel in teaching the symbols. Also, it has been determined that a narrow, finger-tracing recess or groove is most effective in teaching the forming movements of symbols and particularly, if the recess or groove part is of a shape that the base or valley thereof cannot be touched or felt by the finger, thumb or toe of the person being taught, with only the opposite side edges of the recess being felt above its base.

Finally, it has been discovered that a much more vivid impression is imparted by utilizing a somewhat curvilinear irregularity in the sides or edges of the recess or groove along which the finger of the person being taught has to travel. For a sighted person, arrows may be employed on the top face or surface to indicate the direction of formation of the various portions of each recess that defines the symbol that is in the form of a recessed part while contrasting color and small offsets such as dots or circular depressions, may be employed for indicating the order of formation of the various portions. The small dots may be provided in number corresponding to the progression number of different line portions to be employed in forming the particular symbol represented by the recess part. The dots will be of a diameter such that the finger or thumb can feel the depression, but cannot touch its base or valley.

It has thus been an object of the invention to devise a solution to the heretofore encountered difficulties in teaching so-called mentally handicapped persons in particular, and to additionally provide an effective means for teaching the blind.

Another object of the invention has been to develop a new apparatus system or means for teaching the handicapped which will emphasize learning through the sense of feel, but which will combine learning through both the senses of feel and sight.

Another object of the invention has been to develop an improved process for teaching the handicapped.

A still further object of the invention has been to devise a system of blocks for improved teaching of the handicapped which will have means by which the feel or physical sense of the individual can be used to determine the proper top to bottom positioning of a blocklike teaching part, the fact that a given symbol has different portions that are formed in a particular sequence, order or progression and of a particular shape or contour, and by line movement in a particular direction.

These and other objects of the invention will appear to those skilled in the art from the illustrated embodiment and the drawing.

BRIEF DESCRIPTION OF THE DRAWING

FIG. 1 is a top perspective view illustrating a typical blocklike part or element of the apparatus system employed in carrying out the invention.

FIG. 2 is a vertical fragmental section on the scale of and along the line II—II of FIG. 1.

And, FIG. 3 is a somewhat diagrammatic planar layout showing symbols and indicia that may be impressed or formed and used on individual blocklike elements which are of the representative construction illustrated by the element of FIGS. 1 and 2 as employed for letter or symbol R.

DESCRIPTION OF THE PREFERRED EMBODIMENT

Indicia is provided on the top face and includes a symbol representing groove or recess part 15 having irregular edges along which a finger of the person can trace. The recess portions of the part 15 are sufficiently narrow to prevent the base of the finger from contacting the base of the valleys. Arrows, different colors and small offset or other physical means, are employed to indicate the direction and order of forming the lines of the particular symbol. Color and rounded corner indicia is applied to indicate a bottom edge face, with colors being applied in different portions of the recess part and arrows and small offsets, shown as depressions or indentations being applied as indicia to the upper face of the block. The positioning of the depressions is employed to indicate the starting point for each stroke or line, and the number and also, if desired, their color at each starting position is employed to indicate the order of the formation of a particular line portion of the associated symbol.

Referring to FIGS. 1 and 2 of the drawings, a blocklike element 10 of a suitable material, such as wood, plastic or metal, and preferably of a fiberboard or pressboard having a planar and smooth, relatively tough, wear-resistant, upper surface or wide side face 12 is shown as having the letter R formed therein by a recess or groove part 15 that extends from its top face 12. As shown, the blocklike part or element 10 is of substantially rectangular shape having relatively narrow opposed top and bottom, side or thickness edge faces and relatively wide, opposed, upper and under planar side faces. To enable the student to properly align the block 10 and thus its recess part 15 by turning it on a suitable support, such as a table, its bottom edge face is given a distinctive color and the opposite corners or edges 11 of its bottom edge face are rounded, while its upper corners 13 are formed as sharp corners.

Each symbol, such as representative letter R, is formed as a continuous recess part 15 that is divided into portions, such as 16, 17 and 18, that are to be taught as of a particular shape and order of formation. The direction of the formation of each portion is indicated by arrows 20 and by the beginning stroke location of dotlike offsets in the form of small circular depressions or recess portions 21. For example, in FIG. 1 a single dotlike depression 21 is located adjacent the upper end of the base of a selected color (first stroke) portion 16 of the recess part 15 from which, as indicated by the arrow 20, the forming stroke or line is to be started. The forming of the second stroke or line of the letter symbol is indicated by a different color of base or recess portion 17, its direction by an arrow 20', the starting position of its forming and the progression of its forming by a pair or two dotlike portions 21. The final stroke portion 18 is indicated by a third color in recess portion 18, by three dotlike portions 21, with the direction of forming being indicated by an arrow 20'' and by the starting position of the three dotlike portions 21.

Importantly, it will be noted that each recess portion 16, 17 or 18 of the recess part 15 representing the symbol on each block 10, is of relatively narrow width (see FIG. 2) and may be of slightly lesser depth. The recess part 15 has a width extent such that its opposite upper edges 14 serve as limit guide lines for the finger or thumb of the individual tracing it. It will be noted from FIG. 1 that the edges 14 are uneven or wavy; the distance between them should be sufficient that the finger or thumb or other feeling element of the person being taught is, in effect, suspended by such edges and does not reach the base of the recess. It is thus apparent that the limit guide lines defined by the upper edges provide what may be termed a pair of transversely spaced-apart trace line edges that are of a width to support and guide a finger or toe of the student above and out of contact with a base portion of the recess part. This provides a two-way guided relation for the feeling movement of the finger or toe of the student. The use of curvilinear irregularity along such edges gives them a feel-emphasizing construction.

FIG. 3 illustrates how block parts 10 of the system are constructed for different letters of the alphabet and for different representative numbers using the concept basically shown by the block of FIGS. 1 and 2. It will be appreciated that wavy line edges are to be employed throughout due to their striking effectiveness in physically imparting by the sense of feel or touch the shape or contour of a particular recess part that has been formed to represent a particular symbol. This figure indicates that, if desired, the depressions 21 may also be provided with a distinctive color representing the number at a particular position on thp block 10. Although to avoid the use of solid black in FIG. 3, the color brown has been used, I prefer in actual practice to use black color where brown is shown. However, it will be appreciated that any suitable combination of contrasting colors may be utilized.

I claim:

1. In an assembly of blocks of the character shown and described for teaching handicapped or retarded students the shape of and how to properly form different symbols such as numbers, letters of the alphabet and the like, a set of blocks, each block having opposed upper and under wide side faces and relatively narrow opposed side, top and bottom edge faces thereabout to define a body having a substantially rectangular sape, each block having a different symbol on its upper wide side face, first indicium for a bottom edge face of each of said blocks to designate the base of the symbol on said upper wide side face, each symbol being formed as an upwardly open recess part extending downwardly from the upper wide side face of and within the body of the associated block towards said under wide side face thereof, said recess part having a pair of transversely spaced-apart upper contacting and supporting trace line edges that are of a width to support and guide a finger or toe of the student above and out of contact with a base portion of said recess part, whereby the finger or toe can be moved in a two-way guided and supported relation along said trace line edges, said trace line edges having a wavy irregular contour therealong that is of feel-emphasizing construction, second indicia on the body of each of said blocks open to said upper wide side face thereof for indicating along each portion of said recess part the direction and shape of writing movement for forming different portions of the symbol represented by said recess part, third indicia on said body along said recess part to indicate each individual forming stroke portion for the symbol represented thereby and being different for each forming stroke portion to distinguish from other forming stroke portions thereof, and visual indicium within said recess part that comprises different applied colors for indicating each forming stroke portion of the symbol and the order in which it is to be formed.

2. In an assembly of blocks of the character shown and described for teaching retarded or handicapped students the shape of and how to properly form different symbols such as numbers, letters of the alphabet and the like, a set of blocks, each block having opposed upper and under wide side faces and relatively narrow opposed side, top and bottom edge faces thereabout to define a body having a substantially rectangular shape, each block having a different symbol on its upper wide side face, first indicium for a bottom edge face of each of said blocks to designate the base of the symbol on said upper wide side face, each symbol being formed as an upwardly open recess part extending downwardly from the upper wide side face of and within the body of the associated block towards said under wide side face thereof, said recess part being of a relatively narrow finger-suspending width extent that is less than the width of a finger or toe of the student that is to be taught the symbols, whereby the finger or toe can be moved in a guided relation along opposed top edges of said recess part without engaging the base thereof, second indicia on the body of each of said blocks open to said upper wide side face thereof for indicating along each portion of said recess part the direction and shape of writing movement for forming different portions of the symbol represented by said recess part, third indicia on said body along said recess part to indicate each individual forming stroke portion for the symbol represented thereby and being different for each forming stroke portion to distinguish from other forming stroke portions thereof, said first indicium on the bottom edge of each of said blocks being of a distinctive color that is different from the color of other edge portions of said block, and visual indicium within said recess part that comprises different applied colors for indicating each forming stroke portion of the symbol and the order in which it is to be formed.

* * * * *